US007366778B2

(12) United States Patent
White (10) Patent No.: US 7,366,778 B2
(45) Date of Patent: Apr. 29, 2008

(54) CALL CENTRES (75) Inventor: Paul A White, Ipswich (GB)

(73) Assignee: British Telecommunications public limited company, London (GB)

( * ) Notice: Subject to any disclaimer, the term of this patent is extended or adjusted under 35 U.S.C. 154(b) by 892 days.

(21) Appl. No.: 10/474,903

(22) PCT Filed: Apr. 17, 2002

(86) PCT No.: PCT/GB02/01777

§ 371 (c)(1),
(2), (4) Date: Oct. 16, 2003

(87) PCT Pub. No.: WO02/087203

PCT Pub. Date: Oct. 31, 2002

(65) Prior Publication Data

US 2005/0102355 A1 May 12, 2005

(30) Foreign Application Priority Data

Apr. 19, 2001 (EP) .................... 01303601

(51) Int. Cl.
*G06F 13/00* (2006.01)
(52) U.S. Cl. .............. 709/226; 709/229; 709/238; 370/352
(58) Field of Classification Search .............. 709/223, 709/226, 227, 229, 238; 370/352; 379/266.01
See application file for complete search history.

(56) References Cited

U.S. PATENT DOCUMENTS

| 5,414,750 | A | * | 5/1995 | Bhagat et al. ............. 455/416 |
| 5,946,388 | A | | 8/1999 | Walker et al. |
| 6,088,444 | A | | 7/2000 | Walker et al. |
| 6,138,139 | A | | 10/2000 | Beck et al. |
| 6,173,052 | B1 | | 1/2001 | Brady |
| 6,377,568 | B1 | * | 4/2002 | Kelly .......................... 370/352 |
| 6,978,247 | B1 | * | 12/2005 | Bogart et al. ................. 705/8 |
| 2003/0128698 | A1 | * | 7/2003 | Darland et al. ............. 370/360 |

OTHER PUBLICATIONS

Claims granted in the corresponding EP application and responsive arguments filed in EPO and forwarded to Canada and Malaysia for responses, 2001.

* cited by examiner

*Primary Examiner*—Viet D. Vu
(74) *Attorney, Agent, or Firm*—Nixon & Vanderhye P.C.

(57) ABSTRACT

A multimedia call center is formed by providing agent group handlers and generic queue handlers, which communicate over a LAN. The generic features of the queue handlers are an input, and a ranked set of outputs, each having a store for a designer-defined destination address. In this way, media input queue handlers can be commanded to route directly to an agent group handler, via a primary output, or to a following queue handler in dependence upon a selection parameter of a call record, e.g. a user dialed digit in response to a menu announcement from an IVR apparatus, and in this case the menu digits will have a corresponding ranking so that the ranked outputs can be used directly for routing to the appropriate next handler. The designer can specify destinations for secondary and other outputs, which could be overflow agent group handlers, further queue handlers, or, in the case of a second stage queue handler, the network input of the first stage queue handler.

6 Claims, 4 Drawing Sheets

CALL CENTRES

BACKGROUND

1. Technical Field

The present invention relates to call centers, and in particular to call centers having a plurality of different contact channels. In the art, such centers are sometimes referred to as multimedia call centers or multimedia contact centers.

2. Related Art

Traditional call centers are built from many different components, for example Automatic Call Distribution (ACD) switches, Computer Telephony Integration (CTI) middleware, and systems for Interactive Voice Response (IVR), Email, Fax, Web Collaboration, and Voice Recognition. Typically, building routing strategies that encompass this complex environment requires multiple interfaces for different components. This involves a procedural coding paradigm, and quite often complex scripting and programming.

BRIEF SUMMARY

In accordance with a first aspect of the present invention there is provided a method of operating a call center having a communications network; a plurality of agent group handlers connected to the communications network and each having an input port at a respective network address of the communications network; and, for each of a plurality of contact channels incoming to the center, a respective queuing system, each queuing system comprising at least one queue handler connected to the communications network, and each queue handler having an input port at a respective network address of the communications network and a ranked set of output ports at respective network addresses of the communications network, each output port having an associated destination address store;

the method comprising the steps of:

receiving, for each of said plurality of contact channels, calls at the respective queuing system;

creating for each such call received at a queue handler of a respective queuing system a record of call details, and placing that record in a queue;

sending a record currently at the front of the queue of a queue handler to its ranked set of output ports for transmission; and transmitting that record, via a predetermined one of the set of output ports, to a destination handler in accordance with the content of the destination address store associated with that queue handler.

The predetermined one of the set of output ports may be the highest ranking available one.

The transmitting step may transmit that record to the input of an agent group handler.

The ranking of that predetermined one of the set of output ports may correspond to the ranking of selection data provided by a user in response to a menu announcement. This might a dialed digit or a spoken word.

Preferably, the menu announcement offers a plurality of options and each of a corresponding plurality of the set of output ports is arranged to transmit to a respective one of a corresponding plurality of further queue handlers of the respective queuing system.

The transmitting step may be initiated in response to the expiry of a timeout activated upon the placing of that record in the queue, and in this case the predetermined one of the set of output ports may be a default destination.

The default destination may be a message recording facility.

Alternatively, the default destination may be the input of a previous queue handler.

In accordance with a second aspect of the present invention there is provided a call center having:

a communications network;

a plurality of agent group handlers; and a queuing system for each of a plurality of different contact channels, each said queuing system comprising at least one queue handler, wherein:

the handlers are arranged to communicate via messages over the communications network; and each respective said one queue handler is arranged for receiving calls of its respective contact channel and for creating corresponding call detail records; and wherein said queue handlers have generic features comprising:

queue management means;

input means for receiving messages from the communications network; and a ranked plurality of output means for sending messages to the communications network, each output means having a respective associated destination address store, and being responsive to receipt of a call detail record from the queue management means to retrieve the destination address from its associated destination address store and to send that call detail record to that destination address, the queue management means being arranged to form said call detail records into a queue and to process the queue to send the call detail record currently at the front of that queue to a predetermined one of said plurality of output means.

BRIEF DESCRIPTION OF THE DRAWINGS

Specific embodiments of call centers in accordance with the present invention will now be described with reference to the drawings in which.

DETAILED DESCRIPTION OF EXEMPLARY EMBODIMENTS

In this description the following acronyms are used:
CLI Calling Line Identity
CTI Computer Telephony Integration
DNIS Dialed Number Identification Service
DTD Document Type Definition
ISDN Integrated Services Digital Network
IVR Interactive Voice Response
LAN Local Area Network
PBX Private Branch Exchange
URL Universal Resource Locator VM Voice Messaging apparatus (also known as Voicemail)

VoIP Voice over Internet Protocol

XML Extensible Markup Language

Figure 1:
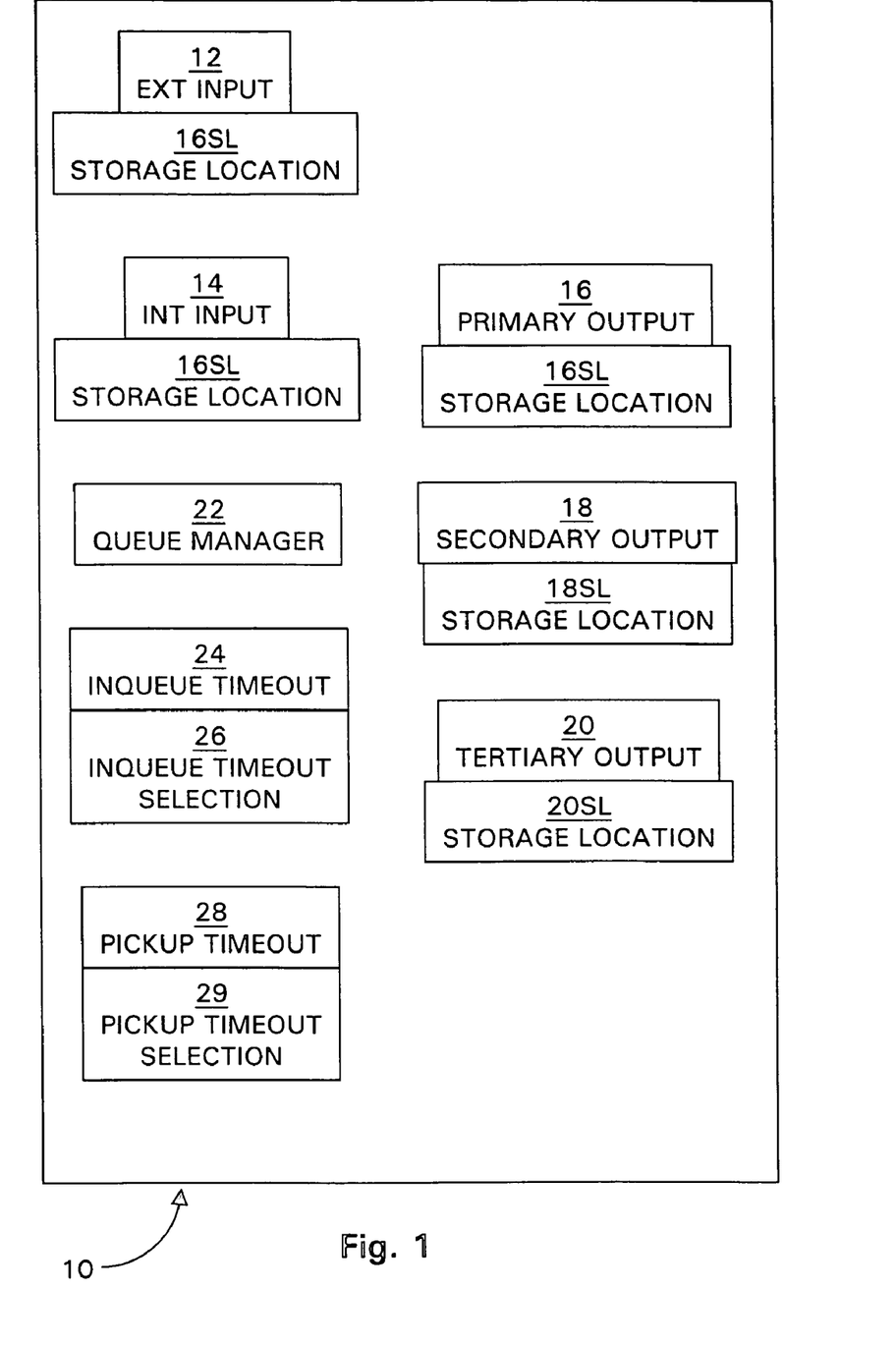
FIG. 1 is a schematic diagram of a generic queue handler used in the present invention.

In FIG. 1, there is shown the common components of a generic queue handler 10 used in call centers of the present invention. The generic queue handler 10 has an external network input port 12, an internal network input port 14, a first internal network output port 16, a second internal network output port 18, and a third internal network output port 20, respective associated storage locations 16SL, 18SL and 20SL for a user-definable destination address for use by the ports for writing to the destination address field of messages to be transmitted onto a LAN, a queue manager 22, an "in queue" timeout 24, an "in queue" timeout selected action 26, a "pickup" timeout 28, and a "pickup" timeout selected action 29.

The internal network output ports 16 to 20 constitute a ranked set of output ports of the present invention. The first internal network output port 16 is also referred to herein as the primary internal network output port, and its associated storage location is also referred to as the primary storage location, and correspondingly for the other two output ports, 18 and 20, and their associated storage locations, 18SL and 20SL.

The input ports 12 and 14 also have respective associated storage locations 12SL and 14SL for a user-definable destination address, but these are not functional in the same sense that the output ports use their user-defined destination addresses for transmitting messages. Rather, they are an aid in identifying the function of the particular queue handler, but in variants they can be used to verify from destination addresses (DNIS/email address/URL) of incoming calls that they have been correctly received at the intended queue handler. The external network input port 12 will have different addresses depending upon the contact channel that a particular queue handler is associated with. In the call centers to be described later, there are three contact channels, namely, an IVR channel for customers to contact the call center by dialling, say, "0800 123456", an Email channel for customers to contact the call center by sending an email message addressed to, say, "sales@fred.com", and a Text Chat channel for customers to contact the call center via a URL, say, "www.fred.com/sales".

Other contact channels that a call center of the present invention might have in alternative embodiments include Web Callback, Fax, Voicemail and VoiceRecognition. Such contact channels are known in the art and will not be described further as they are not concerned with the essence of the present invention.

The term "call" as used herein, is to be understood as covering a communication between a customer and the call center via any of the above contact channels, and any other equivalent contact channels. Furthermore, it will be appreciated that the term contact channel as used herein is synonymous with a type of call. Herein, a customer is also referred to as a caller or a user.

Figure 2:
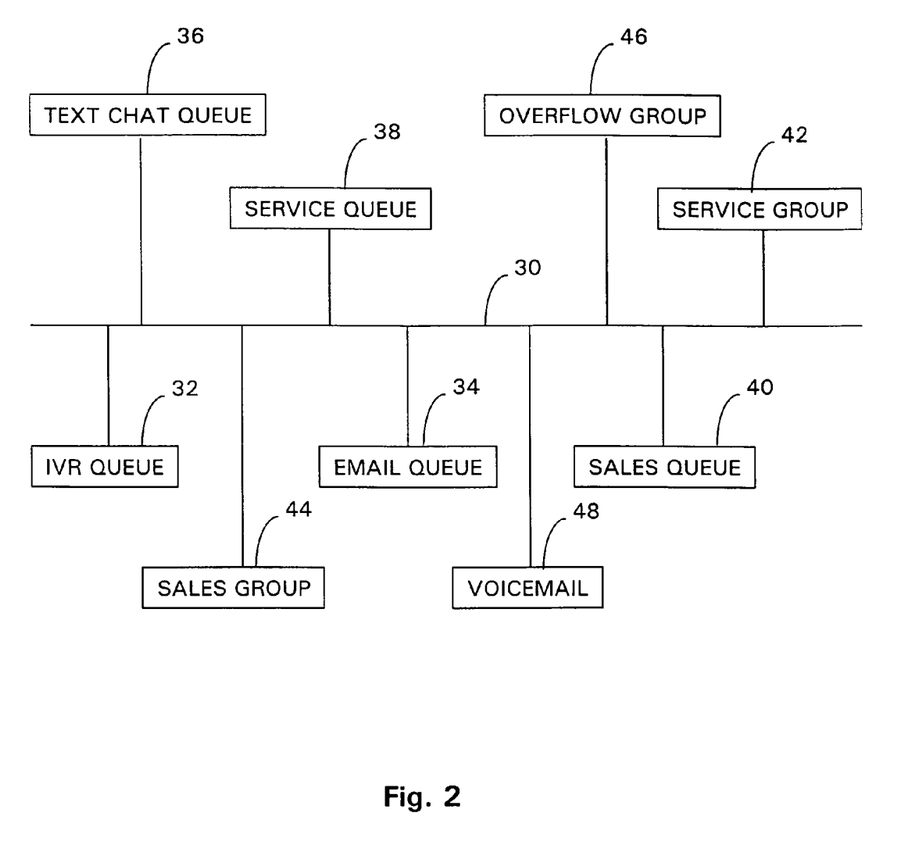
FIG. 2 shows the internal network connections of queue handlers and agent group handlers in a first embodiment of a call center of the present invention.

The internal network input port 14 has an address on a LAN 30 of the call center of FIG. 2, and the internal network output ports 16, 18 and 20 have respective addresses on the LAN 30. The LAN 30 constitutes a communications network of the present invention.

In the description below, for convenience, the following referencing will be used. The ports of queue handler X are X-12 to X-20, the storage locations are X-16SL to X-20SL, the queue manager is X-22, the "in queue" timeout is X-24, the "in queue" timeout selected action is X-26, the "pickup" timeout is X-28, and the "pickup" timeout selected action is X-29.

In FIG. 2 there is shown the LAN 30, to which are connected an IVR queue handler 32, an Email queue handler 34, and a Text Chat queue handler 36. Also connected to the LAN 30 are a Service queue handler 38, a Sales queue handler 40, a Service agent group handler 42, a Sales agent group handler 44, an Overflow agent group handler 46 and a VM 48. The Service queue handler 38 and the Sales queue handler 40 are also of the same form as the generic queue handler 10.

In these embodiments, the agent group handlers are embodied as IP ACDs, and the contact channel queue handler which receive speech channels, e.g. on an ISDN 30 transmission link, contain Dialogic cards for converting the PCM speech into packets for transmission on the LAN 30.

Agents who are principally service agents, but who can also function as sales agents, are also allocated to the Overflow agent group handler 46. The IVR queue handler 32 is arranged to play announcements and collect selection parameters, i.e. user provided digits, as is known in the art, e.g. "Press 1 for service, 2 for sales".

Figure 3:
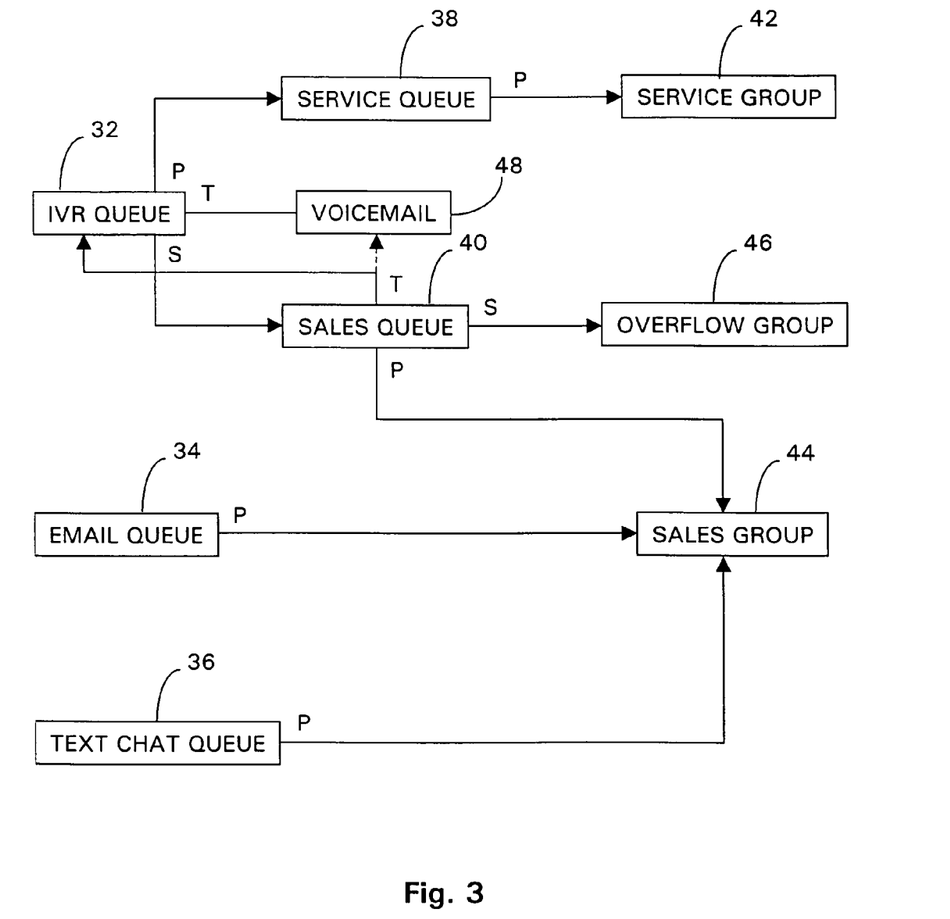
FIG. 3 shows the routing arrangement of queue handlers and agent group handlers in the call center of FIG. 2.

Referring to FIG. 3, this particular routing arrangement has been created by a call center designer performing the following steps. Firstly, each handler, 32 to 46, will be assigned a respective LAN address for its input, 32-14 to 46-14, which will be written to its associated storage location, 32-14SL to 46-14SL.

Then, for the IVR queue handler 32:
assigning a Freefone number "0800 123456" to the storage location 32-12SL of its external network input port 32-12;
assigning the LAN address of the internal network input port 38-14 of the Service queue handler 38 to the primary storage location 32-16SL;
assigning the LAN address of the internal network input port 40-14 of the Sales queue handler 40 to the secondary storage location 32-18SL;
assigning the LAN address of the VM 48 to the tertiary storage location 32-20SL;
assigning the value "100" (seconds) to the Inqueue timeout 32-24;
assigning the identity "VM" to the Inqueue timeout selection 32-26;
assigning the null value to the Pickup timeout 32-28; and
assigning the null value to the Pickup timeout selection 32-29.

It will be appreciated that the queue handlers are aware of the length of time since a call (the call detail record) was put into the queue, and that the agent group handlers are aware of the length of time since a call was delivered to a selected agent.

For the Service queue handler 38, assigning the LAN address of the internal network input port 42-14 of the Service agent group handler 42 to the primary storage location 38-16SL, assigning null addresses to the storage locations 38-12SL, 38-18SL and 38-20SL, and assigning similar values and entries for 38-24 to 38-29, as for 32-24 to 32-29.

For the Sales queue handler 40:
assigning the LAN address of the internal network input port 44-14 of the Sales agent group handler 44 to the primary storage location 40-16SL of the Sales queue handler 40;
assigning the LAN address of the internal network input port 46-14 of the Overflow agent group handler 46 to the secondary storage location 40-18SL of the Sales queue handler 40;

assigning the LAN address of the internal network input port 32-14 of the IVR queue handler 32 to the tertiary storage location 40-20SL of the Sales queue handler 40; and assigning similar values and entries for 40-24 to 40-29, as for 32-24 to 32-29.

For the Service agent group handler 42, assigning null addresses to the storage locations 42-12SL, and 42-18SL and 42-20SL, null data for 42-24 and 42-26, and suitable entries for 42-16SL, 42-28 and 42-29, e.g. for sending a call to the VM 48 if the pickup timeout expires before the selected agent picks up the call.

For the Sales agent group handler 44, assigning null addresses to the storage locations 44-12SL, and 44-16SL to 44-20SL.

For the Overflow agent group handler 46, assigning null addresses to the storage locations 46-12SL, and 46-18SL and 46-20SL, null data for 46-24 and 46-26, and suitable entries for 46-16SL, 46-28 and 46-29, e.g. for sending a call to the VM 48 if the pickup timeout expires before the selected agent picks up the call.

For the Email queue handler 34, assigning the email address "sales@fred.com" to its external network input port 34-12, assigning the LAN address of the internal network input port 44-14 of the Sales agent group handler 44 to the primary storage location 34-16SL of the Email queue handler 34, assigning null entries for 34-12SL, 34-20SL, 34-28 and 34-29, and similar entries for 34-18SL, 34-24 and 34-26.

For the Text Chat queue handler 36, assigning the URL "www.fred.com/sales" to its external network input port 36-12, and assigning the LAN address of the internal network input port 44-14 of the Sales agent group handler 44 to the primary storage location 36-16SL of the Text Chat queue handler 36, and assigning null entries for 36-12SL, 36-20SL, 36-28 and 36-29, and similar entries for 36-18SL, 36-24 and 36-26.

The IVR queue handler 32, the Service queue handler 38 and the Sales queue handler 40 together constitute a queuing system of the present invention.

In operation, the call center of FIG. 3 will receive a telephony call dialed to 0800 123456 at the input 32-12 of the IVR queue handler 32. This is received at the above mentioned Dialogic card and converted to packets, which are routed to the destination device via the LAN 30.

After collecting a selection digit from the calling customer, "1," or "2", in response to a menu announcement, the IVR queue handler 32 will enter that collected digit as the selection parameter in a call detail record for that call, and pass that record to the back of its queue. When a record at the front of the queue is processed, the queue manager 32-22 reads the selection parameter and passes that record to the primary output port 32-16 if the selection parameter is "1" or to the secondary output port 32-18 if the selection parameter is "2".

The Service queue handler 38 receives call detail records from the IVR queue handler 32 and puts them into its queue. When a record is at the front of the queue is processed, the queue manager 38-22 passes that record to the primary output 38-16 for transmission to the Service agent group handler 42. The Service agent group handler 42 distributes records to the agents in its group in accordance with well-known call distribution techniques. When an agent receives a record, the call details are displayed on his computer, together with any additional data that has been retrieved from a database (not shown) by accessing by, e.g. the CLI of the call.

Each agent has a workstation (not shown), as is known in the art, comprising a computer including an IP telephony facility. When the call details are displayed on the agent's computer, the incoming call is routed to that workstation. This can be under the control of the Service agent group handler 42, which delivered that call to a selected agent, by sending a routing request to the Service queue handler 38 or to the IVR queue handler 32.

Consider now the operation of the Sales queue handler 40, which receives records of incoming calls where the selection parameter is "2", i.e. the caller has requested "sales". When a record at the front of its queue is processed, the queue manager 40-22 first checks the primary output port 40-16 to see whether the last received condition notification from the respective agent group queue handler, in this case the Sales agent group queue handler 44, was "busy", i.e. no available agent. If the last received condition notification from the Sales agent group queue handler 44 was "not busy", then the queue manager 40-22 will pass that record to the primary port 40-16.

If the last received condition notification from the Sales agent group queue handler 44 was "busy", then the queue manager 40-22 will pass that record to the secondary output port 40-18, provided that the last received condition notification from the Overflow agent group queue handler 46 was "not busy". If, however, the Overflow agent group queue handler 46 was "busy", the queue manager 40-22 will pass the record to the tertiary output port 40-20, which will route that record back to the internal network input port 32-14 of the IVR queue handler 32 to be added to the back of its queue. In variants, the storage location 40-20SL is assigned the LAN address of the VM 48. Thus, instead of routing the record back to the IVR queue handler 32, it routes the record to the VM 48, as shown by the dashed line in FIG. 3.

In such variants having a VM 48, the tertiary storage location 32-20SL is assigned the LAN address of the VM 48, and the IVR queue handler 32 will route a record to its tertiary output port 32-20 for any of a range of default conditions, e.g. the caller fails to input a selection digit within the inqueue timeout 32-24, the inqueue selection 32-26 containing the identity of the tertiary output port 32-20. In variants, the inqueue selection 32-26 contains the high level identity of the destination, e.g. Voicemail, and the queue manager 32-22 contains a lookup table to translate to the tertiary output port 32-20.

Figure 4:
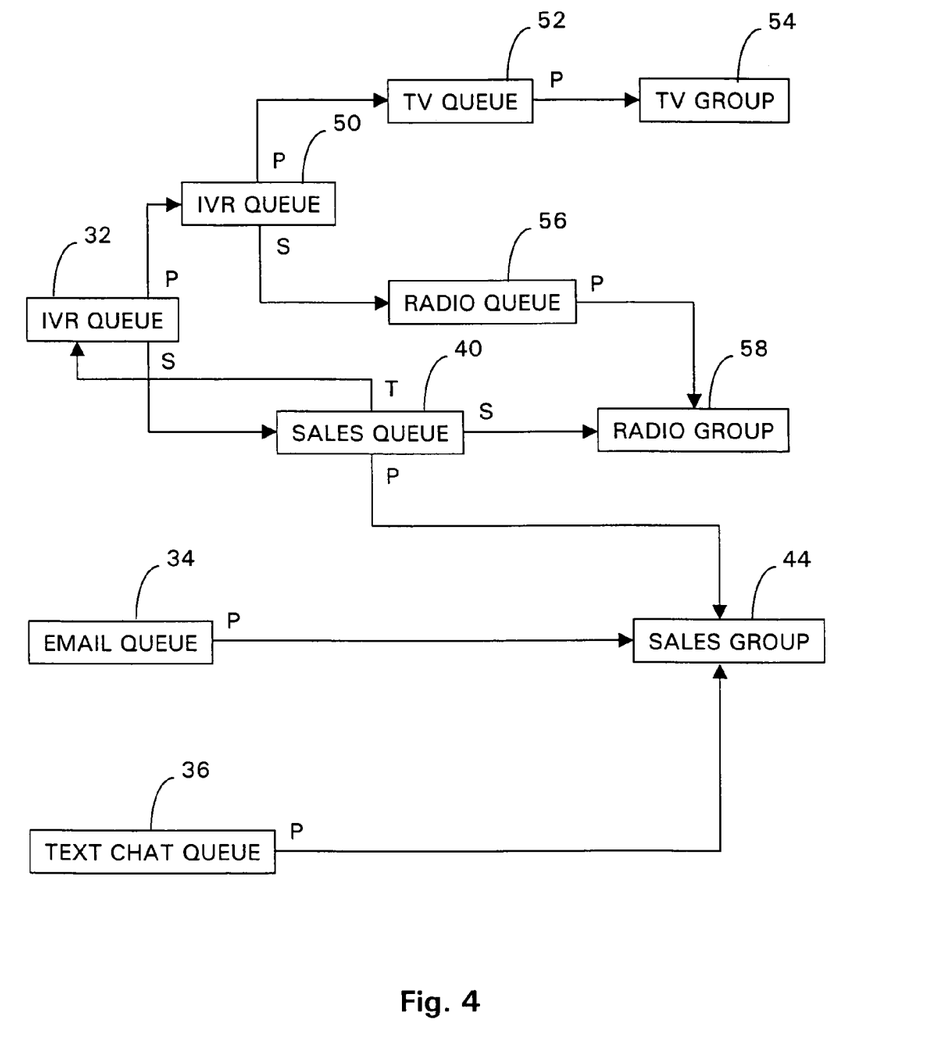
FIG. 4 shows the routing arrangement of queue handlers and agent group handlers in a second embodiment of a call center of the present invention.

FIG. 4 shows a routing arrangement of a second embodiment of a call center having handlers 32, 34, 36, 40 and 44 in common with the call center of FIG. 3, but differing in that it has a second IVR queue handler 50, a Television queue handler 52, a Television agent group handler 54, a Radio queue handler 56, and a Radio agent group handler 58.

The primary storage location 32-16SL is assigned the LAN address of the input port 50-14 of the second IVR queue handler 50, the primary storage location 50-16SL is assigned the LAN address of the input port 52-14 of the Television queue handler 52, the secondary storage location 50-18SL is assigned the LAN address of the input port 56-14 of the Radio queue handler 56, the primary storage location 52-16SL of the Television queue handler 52 is assigned the LAN address of the input port 54-14 of the Television agent group handler 54, the primary storage location 56-16SL of the Radio queue handler 56 is assigned the LAN address of the input port 58-14 of the Radio agent group handler 58, and the secondary storage location 40-18SL of the Sales queue handler 40 is assigned the LAN address of the input port 58-14 of the Radio agent group handler 58. Other entries are assigned similarly to those of the first embodiment.

The second IVR queue handler 50 is arranged to play the announcement "Press 1 for televisions, or 2 for radios", and in this second embodiment the agents of the radio group can also function as sales agents.

In the first embodiment, the generic handler has a single internal network input port. Thus the Sales group handler 44 can receive records from all of its three source handlers, Email queue handler 34, Text Chat queue handler 36 and Sales queue handler 40, and the LAN 30 will use standard contention resolution to control the transmission onto the LAN 30. In variants, the generic queue handler is provided with a plurality of input ports, each having its own respective network address, and can receive messages at the three inputs simultaneously. In this case, the call center designer can assign a different network input address to each of the storage locations 34-16SL, 36-16SL and 40-16SL.

It will be appreciated that the queue handlers have internal handling technology appropriate to their respective contact channel, i.e. for emails, the queue handler will be based on an email handler, and for public switched network telephony calls, the handler will be based on a telephony card such as the Dialogic card mentioned above. Nevertheless, in accordance with the present invention, for the purpose of building a call center using such queue handlers as building blocks and specifying the inter-block routing by providing to the queue handler outputs the respective desired destination addresses, the queue handlers have a set of common features in terms of their inputs and outputs, and particularly in that the outputs are in the form of a ranked set, whereby a record is sent to a primary destination, if it can accept the record, or to a secondary destination, and so on, and the same ranked set is used in conjunction with the selection parameter of a record (the caller's response to a menu announcement) to route the record, i.e. by using the same ranking of the selection. In other words, if the Television agent group handler is the destination for the primary output, then the selection digit corresponding to "Television" must also be the highest ranking. If the caller is invited to "Press 1 for televisions", then "1" must be deemed the highest ranking digit, but if the caller is invited to "Press 2 for televisions", then "2" must be deemed the highest ranking digit, if the Television queue handler 52 is the destination for the primary output port 50-16. Furthermore, the queue handlers can have timeouts assigned, and the behaviour specified by the designer, e.g. that upon expiry of the timeout the call is sent to Voicemail, or in the case of a later-stage queue handler or group handler, the call can be routed back to an earlier queue handler, possibly the first stage queue handler, e.g. the IVR queue handler 32.

It will be appreciated that the handlers of the present invention can conveniently be embodied in software objects using object oriented technology, and in this case a queue handler could thus be alternatively referred to as a queue object.

The use of a generic form for the queue handlers in the present invention provides an easy to use, non-pragmatic solution that enables a call center designer to avoid the problems previously encountered with the prior art procedural coding paradigm. The generic queue handler provides the call center designer with the same abstract routing mechanism regardless of the media type (contact channel), and the ability to link together hierarchies of queues in a declarative manner allows complex routing strategies without resorting to the prior art procedural coding paradigm.

Furthermore, the use of a generic form for the queue handlers means that the design of the routing strategy is independent of specific vendor solutions, and underlying technologies.

An XML definition for the call center of FIG. 3, based on the formal specification (XML DTD definition) set out later, is as follows:

```
<RoutingStrategy name = "Sample1" description = "A Sample XML Representation of
a Routing Strategy" timestamp = "200102131600">
    <Queues>
        <Queue name = "IVRQ" type = "IVR" queueData = "Welcome.wav"
description = "IVR Entry point" servicelevel = "100" TQoS = "100"
pickuptimeout = "100" inqueuetimeout = "100" >
            <QueueSources>
                <QueueSource>0800123456</QueueSource>
            </QueueSources>
            <LinkedQueues>
                <LinkedQueue selection = 1>ServiceQ</LinkedQueue>
                <LinkedQueue selection = 2>SalesQ</LinkedQueue>
            <LinkedQueues>
        </Queue>
        <Queue name = "ServiceQ" type = "Route" queueData = ""
description = "Queue for service group" servicelevel = "100" TQoS = "100"
pickuptimeout = "100" inqueuetimeout = "100" >
            <LinkedGroups>
                <LinkedGroup
isprimary = "Y">ServiceG</LinkedGroup>
            </LinkedGroups>
        </Queue>
        <Queue name = "SalesQ" type = "Route" queueData = ""
description = "Queue for sales group" servicelevel = "100" TQoS = "100"
pickuptimeout = "100" inqueuetimeout = "100" >
            <LinkedGroups>
                <LinkedGroup isprimary = "Y">SalesG</LinkedGroup>
                <LinkedGroup
isprimary = "N">OverflowG</LinkedGroup>
            </LinkedGroups>
        </Queue>
        <Queue name = "EmailQ" type = "Email" queueData = ""
description = "Email sales queue" servicelevel = "100" TQoS = "100"
```

-continued

```
pickuptimeout = "100" inqueuetimeout = "100" >
        <QueueSources>
            <QueueSource> sales@fred.com </QueueSource>
            <QueueSource> sales@fred.co.uk </QueueSource>
        <QueueSources>
        <LinkedGroups>
            <LinkedGroup isprimary = "Y">SalesG</LinkedGroup>
        </LinkedGroups>
    </Queue>
    <Queue name = "ChatQ" type = "Chat" queueData = ""
description = "Chat sales queue" servicelevel = "100" TQoS = "100"
pickuptimeout = "100" inqueuetimeout = "100" >
        <LinkedGroups>
            <LinkedGroup isprimary = "Y">SalesG</LinkedGroup>
        </LinkedGroups>
    </Queue>
</Queues>
<Groups>
    <Group name = "SalesG" description = "Description of GroupSales">
        <LinkedAgents>
            <LinkedAgent>CCLIVE\Arnold</LinkedAgent>
            <LinkedAgent>CCLIVE\Bruce</LinkedAgent>
            <LinkedAgent>CCLIVE\Sylvester</LinkedAgent>
        </LinkedAgents>
    </Group>
    <Group name = "ServiceG" description = "Description of
GroupService">
        <LinkedAgents>
            <LinkedAgent>CCLIVE\Arnold</LinkedAgent>
            <LinkedAgent>CCLIVE\Kevin</LinkedAgent>
            <LinkedAgent>CCLIVE\Kate</LinkedAgent>
        </LinkedAgents>
    </Group>
    <Group name = "OverflowG" description = "Extras">
        <LinkedAgents>
            <LinkedAgent>CCLIVE\Julia</LinkedAgent>
            <LinkedAgent>CCLIVE\Mandelbrot</LinkedAgent>
        </LinkedAgents>
    </Group>
</Groups>
<Agents>
    <Agent name = "CCLIVE\Arnold" password = "***"
description = "Description of A1" firstname = "A" lastname = "1" isagent = "Y"
issupervisor = "N" isadministrator = "N"/>
    <Agent name = "CCLIVE\Bruce" password = "***"
description = "Description of A2" firstname = "A" lastname = "2" isagent = "Y"
issupervisor = "N" isadministrator = "N"/>
    <Agent name = "CCLIVE\Sylvester" password = "***"
description = "Description of A3" firstname = "A" lastname = "3" isagent = "Y"
issupervisor = "Y" isadministrator = "N"/>
    <Agent name = "CCLIVE\Kevin" password = "***"
description = "Description of A4" firstname = "A" lastname = "4" isagent = "Y"
issupervisor = "N" isadministrator = "N"/>
    <Agent name = "CCLIVE\Kate" password = "***"
description = "Description of A5" firstname = "A" lastname = "5" isagent = "Y"
issupervisor = "Y" isadministrator = "N"/>
    <Agent name = "CCLIVE\Julia" password = "***"
description = "Description of A6" firstname = "A" lastname = "6" isagent = "Y"
issupervisor = "Y" isadministrator = "N"/>
    <Agent name = "CCLIVE\Mandelbrot" password = "***"
description = "Description of A7" firstname = "A" lastname = "7" isagent = "Y"
issupervisor = "Y" isadministrator = "N"/>
</Agents>
<ReleaseCodes>
    <ReleaseCode name = "CoffeeBreak" description = "Description of
Code1"/>
    <ReleaseCode name = "Lunch" description = "Description of Code2"/>
    <ReleaseCode name = "Personal" description = "Description of
Code3"/>
    <ReleaseCode name = "End of Day" description = "Description of
Code4"/>
</ReleaseCodes>
<WrapUpCodes>
    <WrapUpCode name = "Wrong number" description = "Description of
Code1"/>
    <WrapUpCode name = "Sale" description = "Description of Code2"/>
    <WrapUpCode name = "Resolved" description = "Description of
```

-continued

```
Code3"/>
        <WrapUpCode name = "Customer hung up" description = "Description
of Code4"/>
    </WrapUpCodes>
</RoutingStrategy>
```

An XML definition for the call center of FIG. 4, based on the formal specification (XML DTD definition) set out later, is as follows:

```
<RoutingStrategy name = "sample1" description = "A Sample XML Representation of
a Routing Strategy" timestamp = "200102131600">
    <Queues>
        <Queue name = "IVRQ1" type = "IVR" queueData = "Welcome.wav"
description = "IVR Entry point" servicelevel = "100" TQoS = "100"
pickuptimeout = "100" inqueuetimeout = "100" >
            <QueueSources>
                <QueueSource>0800123456</QueueSource>
            </QueueSources>
            <LinkedQueues>
                <LinkedQueue selection = 1>IVRQ2</LinkedQueue>
                <LinkedQueue selection = 2>SalesQ</LinkedQueue>
            <LinkedQueues>
        </Queue>
        <Queue name = "IVRQ2" type = "IVR" queueData = "Service.wav"
description = "Service options" servicelevel = "100" TQoS = "100"
pickuptimeout = "100" inqueuetimeout = "100" >
            <LinkedQueues >
                <LinkedQueue selection = 1>TVQ</LinkedQueue>
                <LinkedQueue selection = 2>RadioQ</LinkedQueue>
            <LinkedQueues>
        </Queue>
        <Queue name = "TVQ" type = "Route" queueData = ""
description = "Queue for TV group" servicelevel = "100" TQoS = "100"
pickuptimeout = "100" inqueuetimeout = "100" >
            <LinkedGroups>
                <LinkedGroup isprimary = "Y">TVG</LinkedGroup>
            </LinkedGroups>
        </Queue>
        <Queue name = "RadioQ" type = "Route" queueData = ""
description = "Queue for Radio group" servicelevel = "100" TQoS = "100"
pickuptimeout = "100" inqueuetimeout = "100" >
            <LinkedGroups>
                <LinkedGroup isprimary = "Y">RadioG</LinkedGroup>
            </LinkedGroups>
        </Queue>
        <Queue name = "SalesQ" type = "Route" queueData = ""
description = "Queue for sales group" servicelevel = "100" TQoS = "100"
pickuptimeout = "100" inqueuetimeout = "100" >
            <LinkedGroups>
                <LinkedGroup isprimary = "Y">SalesG</LinkedGroup>
                <LinkedGroup isprimary = "N">RadioG</LinkedGroup>
            </LinkedGroups>
        </Queue>
        <Queue name = "EmailQ" type = "Email" queueData = ""
description = "Email sales queue" servicelevel = "100" TQoS = "100"
pickuptimeout = "100" inqueuetimeout = "100" >
            <QueueSources>
                <QueueSource> sales@fred.com </QueueSource>
                <QueueSource> sales@fred.co.uk </QueueSource>
            <QueueSources>
            <LinkedGroups>
                <LinkedGroup isprimary = "Y">SalesG</LinkedGroup>
            </LinkedGroups>
        </Queue>
        <Queue name = "ChatQ" type = "Chat" queueData = ""
description = "Chat sales queue" servicelevel = "100" TQoS = "100"
pickuptimeout = "100" inqueuetimeout = "100" >
            <LinkedGroups>
                <LinkedGroup isprimary = "Y">SalesG</LinkedGroup>
            </LinkedGroups>
        </Queue>
    </Queues>
```

```
<Groups>
    <Group name = "SalesG" description = "Description of GroupSales">
        <LinkedAgents>
            <LinkedAgent>CCLIVE\Arnold</LinkedAgent>
            <LinkedAgent>CCLIVE\Bruce</LinkedAgent>
            <LinkedAgent>CCLIVE\Sylvester</LinkedAgent>
        </LinkedAgents>
    </Group>
    <Group name = "RadioG" description = "Description of RadioGroup">
        <LinkedAgents>
            <LinkedAgent>CCLIVE\Bruce</LinkedAgent>
            <LinkedAgent>CCLIVE\Kevin</LinkedAgent>
        </LinkedAgents>
    </Group>
    <Group name = "TVG" description = "Description of TVGroup">
        <LinkedAgents>
            <LinkedAgent>CCLIVE\Kate</LinkedAgent>
            <LinkedAgent>CCLIVE\Arnold</LinkedAgent>
            <LinkedAgent>CCLIVE\Julia</LinkedAgent>
            <LinkedAgent>CCLIVE\Mandelbrot</LinkedAgent>
        </LinkedAgents>
    </Group>
</Groups>
<Agents>
    <Agent name = "CCLIVE\Arnold" password = "***"
description = "Description of A1" firstname = "A" lastname = "1" isagent = "Y"
issupervisor = "N" isadministrator = "N"/>
    <Agent name = "CCLIVE\Bruce" password = "***"
description = "Description of A2" firstname = "A" lastname = "2" isagent = "Y"
issupervisor = "N" isadministrator = "N"/>
    <Agent name = "CCLIVE\Sylvester" password = "***"
description = "Description of A3" firstname = "A" lastname = "3" isagent = "Y"
issupervisor = "Y" isadministrator = "N"/>
    <Agent name = "CCLIVE\Kevin" password = "***"
description = "Description of A4" firstname = "A" lastname = "4" isagent = "Y"
issupervisor = "N" isadministrator = "N"/>
    <Agent name = "CCLIVE\Kate" password = "***"
description = "Description of A5" firstname = "A" lastname = "5" isagent = "Y"
issupervisor = "Y" isadministrator = "N"/>
    <Agent name = "CCLIVE\Julia" password = "***"
description = "Description of A6" firstname = "A" lastname = "6" isagent = "Y"
issupervisor = "Y" isadministrator = "N"/>
    <Agent name = "CCLIVE\Mandelbrot" password = "***"
description = "Description of A7" firstname = "A" lastname = "7" isagent = "Y"
issupervisor = "Y" isadministrator = "N"/>
</Agents>
<ReleaseCodes>
    <ReleaseCode name = "CoffeeBreak" description = "Description of Code1"/>
    <ReleaseCode name = "Lunch" description = "Description of Code2"/>
    <ReleaseCode name = "Personal" description = "Description of Code3"/>
    <ReleaseCode name = "End of Day" description = "Description of Code4"/>
</ReleaseCodes>
<WrapUpCodes>
    <WrapUpCode name = "Wrong number" description = "Description of Code1"/>
    <WrapUpCode name = "Sale" description = "Description of Code2"/>
    <WrapUpCode name = "Resolved" description = "Description of Code3"/>
    <WrapUpCode name = "Customer hung up" description = "Description of Code4"/>
</WrapUpCodes>
</RoutingStrategy>
```

The following XML DTD definition is the formal specification for the routing strategy of the present invention, and it includes detailed comments to assist its understanding.

```
<* * The routing strategy represents a particular collection of
<* * routing objects
<!ELEMENT RoutingStrategy (Queues, Groups, Agents) >
<!ATTLIST RoutingStrategy name ID #REQUIRED >
<!ATTLIST RoutingStrategy description CDATA #IMPLIED >
<!ATTLIST RoutingStrategy timestamp CDATA #REQUIRED >
<!ATTLIST RoutingStrategy version CDATA "1.0" >
<* * a routing strategy must contain at least one queue, group & agent
<!ELEMENT Queues (Queue+) >
<!ELEMENT Groups (Group+) >
<!ELEMENT Agents (Agent+) >
<* * a queue must have a name and optionally has a source address -
<* * unless it is just a routing queue - the output of a queue is
```

-continued

```
<* * either a linkedGroup or a linkedQueue
<!ELEMENT Queue (QueueSources?, (LinkedGroups | LinkedQueues)) >
<!ATTLIST Queue name ID #REQUIRED >
<!ATTLIST Queue description CDATA #IMPLIED >
<* * type indicates the media being represented by this queue.
<* * a 'Route'ing queue is a generic queue that is independent
<* * of media type
<!ATTLIST Queue type
(Voice | Chat | Fax | Callback | Email | Route | IVR
|SpeechRecognition | Voicemail) #REQUIRED >
<* * TqoS represents the quality of service and hence the priority
<* * of contact events routed through this queue. This is particularly
<* * important when different media types are 'blended' to common
<* * groups - for example voice queues should be higher priority than
<* * email queues
<!ATTLIST Queue TQoS CDATA #REQUIRED >
<* * Queue timeouts allow default actions to take place if
<* * contact events are not delivered within the specified intervals
<!ATTLIST Queue inqueuetimeout CDATA #REQUIRED >
<!ATTLIST Queue pickuptimeout CDATA #REQUIRED >
<!ATTLIST Queue servicelevel CDATA #REQUIRED >
<* * queue data provides specific information dependent
<* * on queue type e.g. for an IVR queue, the queue data is
<* * the '.wav' file of the IVR message
<!ATTLIST Queue queueData CDATA #IMPLIED >
<* * queueSource represents one or more queue input addresses
<* * a telephone no., email or url
<!ELEMENT QueueSources (QueueSource+) >
<!ELEMENT LinkedGroups (LinkedGroup+) >
<!ELEMENT LinkedQueues (LinkedQueue+) >
<!ELEMENT QueueSource (#PCDATA) >
<* * linked groups consist of one primary and multiple
<* * non primary (secondary) groups
<!ELEMENT LinkedGroup (#PCDATA) >
<!ATTLIST LinkedGroup isprimary (Y | N) #REQUIRED >
<* * the queue selection is the event that causes the
<* * particular linked queue to be selected e.g. an IVR or
<* * speech recognition prompt
<!ELEMENT LinkedQueue (#PCDATA) >
<!ATTLIST LinkedQueue selection CDATA #REQUIRED >
<* * a group consists of a set of agents. Note that agents can
<* * be in multiple groups, and a group can be 'pointed' at by
<* * multiple queues, this latter concept allows agents to receive
<* * contact events from many different media types, i.e. the concept
<* * of blending media types
<!ELEMENT Group (LinkedAgents+) >
<!ATTLIST Group name ID #REQUIRED >
<!ATTLIST Group description CDATA #IMPLIED >
<!ELEMENT LinkedAgents (LinkedAgent+) >
<!ELEMENT LinkedAgent (#PCDATA) >
<!ELEMENT Agent (EMPTY) >
<!ATTLIST Agent name ID #REQUIRED >
<!ATTLIST Agent password CDATA #IMPLIED >
<!ATTLIST Agent description CDATA #IMPLIED >
<!ATTLIST Agent firstname CDATA #IMPLIED >
<!ATTLIST Agent lastname CDATA #IMPLIED >
<!ATTLIST Agent isagent (Y | N) #REQUIRED >
<!ATTLIST Agent issupervisor (Y | N) #REQUIRED >
<!ATTLIST Agent isadministrator (Y | N) #REQUIRED >
```

Unless the context clearly requires otherwise, throughout the description and the claims, the words "comprise", "comprising" and the like are to be construed in an inclusive as opposed to an exclusive or exhaustive sense; that is to say, in the sense of "including, but not limited to".

What is claimed is:

1. A method of operating a call center having a communications network; a plurality of agent group handlers connected to the communications network and each having an input port at a respective network address of the communications network; and, for each of a plurality of contact channels incoming to the center, a respective queuing system, each queuing system comprising at least one queue handler connected to the communications network, and each queue handler having an input port at a respective network address of the communications network and a ranked set of output ports at respective network addresses of the communications network, each output port having an associated destination address store; the method comprising:
   receiving, for each of said plurality of contact channels, calls at the respective queuing system;
   creating for each such call received at a queue handler of a respective queuing system a record of call details, and placing that record in a queue;
   sending a record currently at the front of the queue of a queue handler to its ranked set of output ports for transmission; and
   transmitting that record, via a predetermined one of the set of output ports, to a destination handler in accordance with the content of the destination address store associated with that queue handler.

2. A method as in claim 1, wherein that predetermined one of the set of output ports is the highest ranking available one.

3. A method as in claim 2, wherein the transmitting step transmits that record to the input of an agent group handler.

4. A method as in claim 1, wherein the ranking of that predetermined one of the set of output ports corresponds to the ranking of a selection digit provided by a user in response to a menu announcement.

5. A method as in claim 4, wherein the menu announcement offers a plurality of options and each of a corresponding plurality of the set of output ports is arranged to transmit to a respective one of a corresponding plurality of further queue handlers of the respective queuing system.

6. A call center comprising:
   a communications network;
   a plurality of agent group handlers; and
   a queuing system for each of a plurality of different contact channels, each said queuing system comprising at least one queue handler,
   wherein:
      the handlers are arranged to communicate via messages over the communications network; and
      each respective said one queue handler is arranged for receiving calls of its respective contact channel and for creating corresponding call detail records; and
      said queue handlers have generic features comprising:
         queue management means;
         input means for receiving messages from the communications network; and
         a ranked plurality of output means for sending messages to the communications network, each output means having a respective associated destination address store, and being responsive to receipt of a call detail record from the queue management means to retrieve the destination address from its associated destination address store and to send that call detail record to that destination address, the queue management means being arranged to form said call detail records into a queue and to process the queue to send the call detail record currently at the front of that queue to a predetermined one of said plurality of output means.

* * * * *